(12) United States Patent
Kuneva

(10) Patent No.: US 12,299,270 B2
(45) Date of Patent: *May 13, 2025

(54) METHODS AND SYSTEMS FOR SECURE AUTHENTICATION IN A VIRTUAL OR AUGMENTED REALITY ENVIRONMENT USING AN INTERACTIVE ICON

(71) Applicant: Worldpay Limited, London (GB)

(72) Inventor: Antoniya Kuneva, London (GB)

(73) Assignee: Worldpay Limited, London (GB)

( * ) Notice: Subject to any disclaimer, the term of this patent is extended or adjusted under 35 U.S.C. 154(b) by 27 days.

This patent is subject to a terminal disclaimer.

(21) Appl. No.: 18/498,381

(22) Filed: Oct. 31, 2023

(65) Prior Publication Data

US 2024/0061568 A1 Feb. 22, 2024

Related U.S. Application Data

(63) Continuation of application No. 18/052,380, filed on Nov. 3, 2022, now Pat. No. 11,836,339, which is a continuation of application No. 16/713,881, filed on Dec. 13, 2019, now Pat. No. 11,662,894.

(51) Int. Cl.
*G06F 3/04847* (2022.01)
*G06F 3/04817* (2022.01)
*G06Q 20/38* (2012.01)
*G06Q 20/40* (2012.01)

(52) U.S. Cl.
CPC ...... *G06F 3/04847* (2013.01); *G06F 3/04817* (2013.01); *G06Q 20/382* (2013.01); *G06Q 20/4012* (2013.01); *G06Q 20/405* (2013.01)

(58) Field of Classification Search
None
See application file for complete search history.

(56) References Cited

U.S. PATENT DOCUMENTS

| | | | |
|---|---|---|---|
| 9,032,498 B1 | 5/2015 | Ayed | |
| 10,362,024 B2* | 7/2019 | Jakobsson | G06F 21/45 |
| 2002/0029342 A1* | 3/2002 | Keech | G07F 7/10 |
| | | | 705/64 |
| 2007/0266428 A1* | 11/2007 | Downes | G06F 21/36 |
| | | | 726/5 |
| 2010/0109920 A1 | 5/2010 | Spradling | |
| 2012/0268393 A1 | 10/2012 | Lee | |
| 2012/0323788 A1* | 12/2012 | Keresman, III | G07F 7/1041 |
| | | | 705/44 |
| 2013/0085942 A1 | 4/2013 | Shirol | |

(Continued)

*Primary Examiner* — Linda Huynh
(74) *Attorney, Agent, or Firm* — Bookoff McAndrews PLLC

(57) ABSTRACT

Methods and systems are disclosed for providing secure authentication in a virtual or augmented reality environment using an interactive icon. One method comprises: receiving, over a computer network, a request for payment authorization; identifying, based on the request for payment authorization, a virtual reality interface; generating an icon in the virtual reality interface, the icon having a randomized display of authentication characters; receiving user input associated with at least one character of the of payment authentication characters in the virtual reality interface; and generating a payment authorization response to the request for payment authorization based on the received user input.

20 Claims, 15 Drawing Sheets

(56) References Cited

U.S. PATENT DOCUMENTS

| | | | |
|---|---|---|---|
| 2014/0365377 A1* | 12/2014 | Salama | G06Q 20/401 |
| | | | 705/78 |
| 2015/0095241 A1* | 4/2015 | Edwards | G07F 7/1033 |
| | | | 705/72 |
| 2016/0006718 A1* | 1/2016 | Huxham | G06F 21/35 |
| | | | 726/6 |
| 2016/0125181 A1 | 5/2016 | Zovi | |
| 2016/0364723 A1* | 12/2016 | Reese | G06Q 20/202 |
| 2017/0068960 A1* | 3/2017 | Kwak | G06Q 20/405 |
| 2018/0157820 A1* | 6/2018 | Adams | G06F 3/017 |
| 2018/0253226 A1 | 9/2018 | Hajimusa et al. | |
| 2018/0285549 A1* | 10/2018 | Sonkar | G06Q 20/40145 |
| 2019/0058992 A1* | 2/2019 | Kurian | H04W 12/06 |
| 2019/0319938 A1* | 10/2019 | Castinado | H04L 9/0637 |

\* cited by examiner

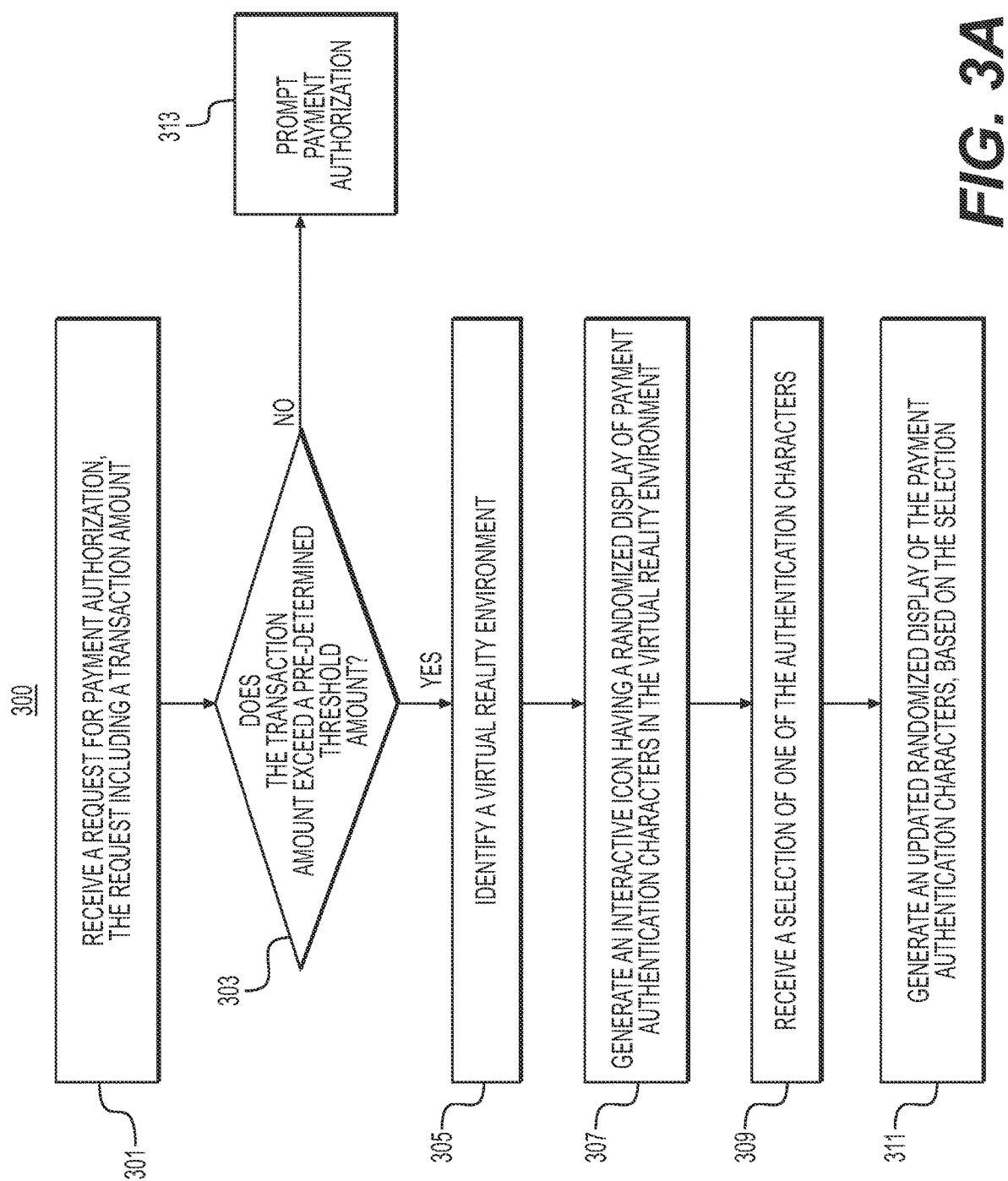

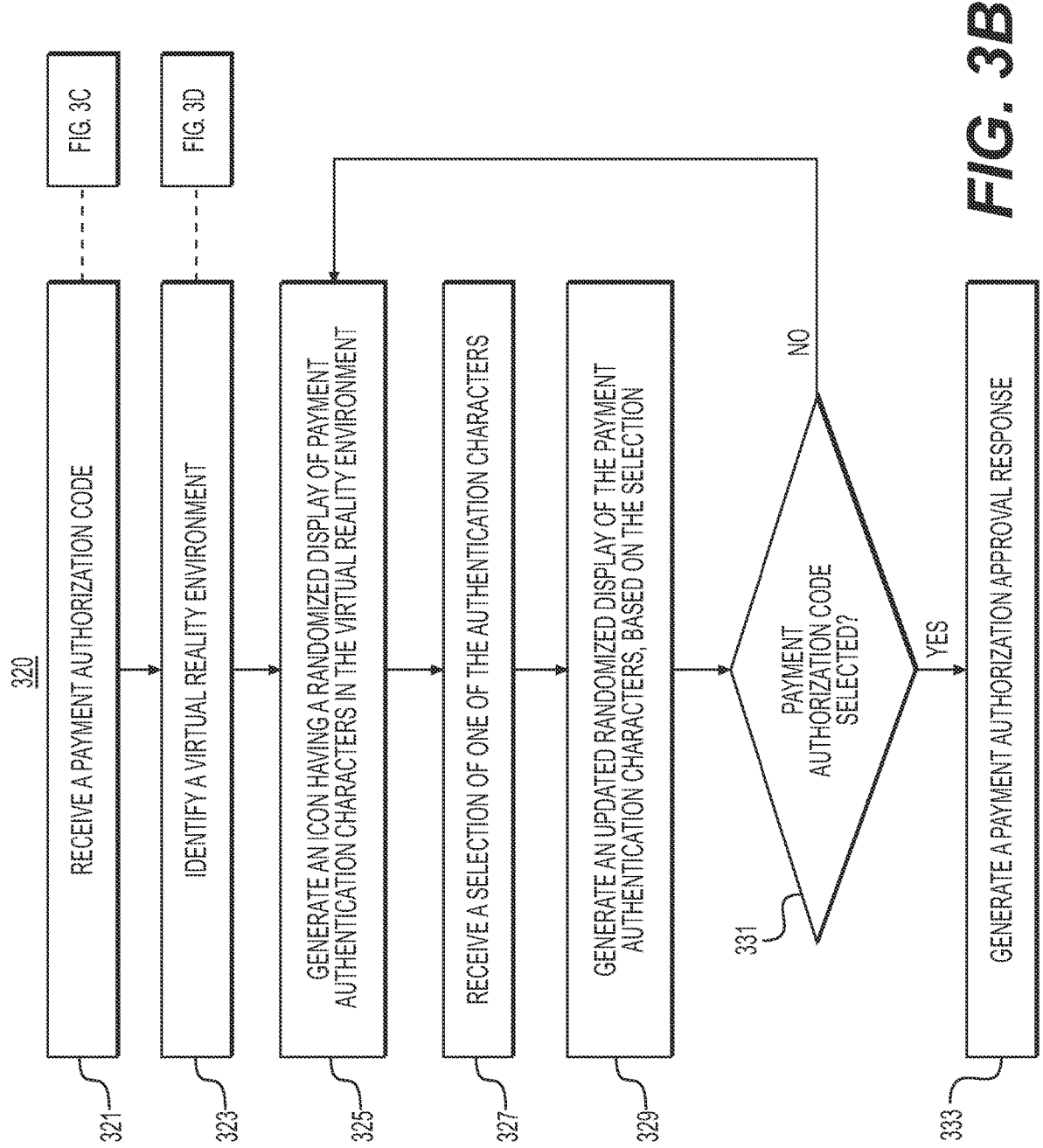

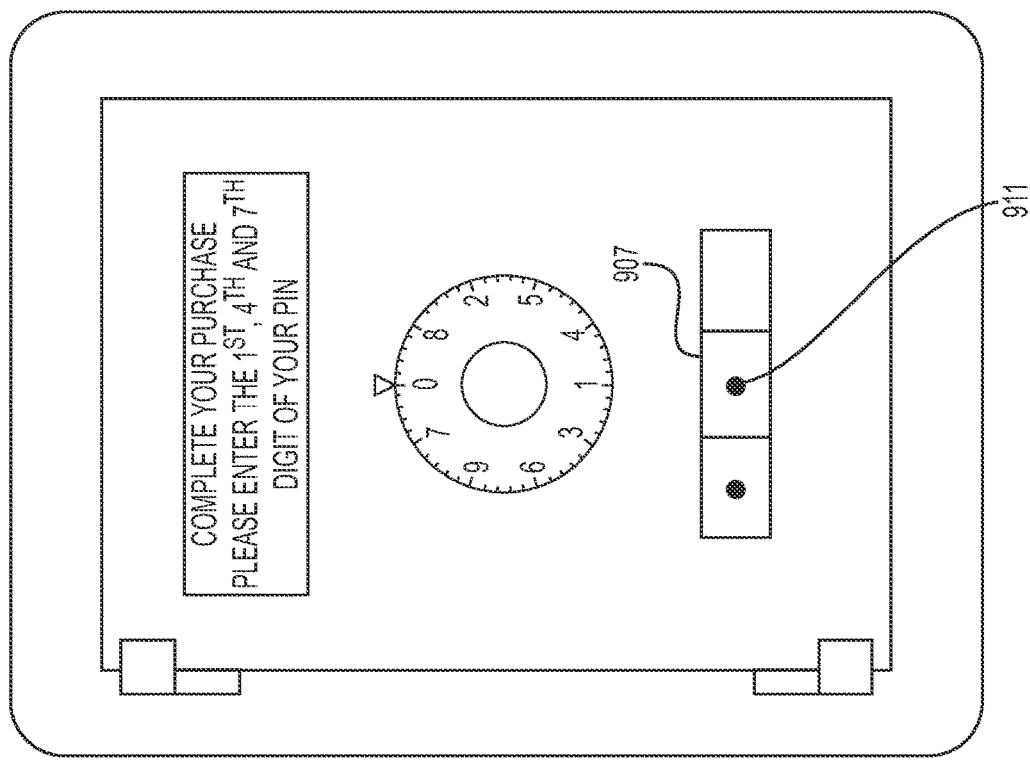

ized displa

METHODS AND SYSTEMS FOR SECURE AUTHENTICATION IN A VIRTUAL OR AUGMENTED REALITY ENVIRONMENT USING AN INTERACTIVE ICON

CROSS-REFERENCE TO RELATED APPLICATION(S)

This patent application is a continuation of and claims the benefit of priority to U.S. application Ser. No. 18/052,380, filed on Nov. 3, 2022, which is a continuation of U.S. application Ser. No. 16/713,881, filed on Dec. 13, 2019, now U.S. Pat. No. 11,662,894, the entireties of which are incorporated herein by reference.

TECHNICAL FIELD

Various embodiments of the present disclosure relate generally to electronic payment processing and, more particularly, to configuring a virtual reality or augmented reality payment authentication entry interface comprising an interactive icon.

BACKGROUND

Traditionally, merchants and other store owners have point of sale (POS) terminals that can accept check or payment card from consumers for goods and services. Such POS systems may include PIN pads at which a consumer may enter payment and/or personal information in order to complete payment processing requests for purchases. These PIN pads may have a known arrangement of alphanumeric characters in the form of 12 buttons arranged in 4 rows and 3 columns. The first row may include numbers 1, 2, and 3; the second row may include the numbers 4, 5, and 6; the third row may include numbers 7, 8, and 9; and the last row may include "*", 0, and "#". Each of the numbers may also have associated letters of the alphabet in a standard format. This standard configuration means that an individual watching a user may easily detect or infer a user's PIN number/payment credentials by watching the user's selection of buttons and correlating the user's selections with standard positions of alphanumeric characters in a PIN pad. This detectability of a user's payment credentials may be exacerbated while a user is in a virtual reality or augmented reality environment, and less aware of their surroundings.

To elaborate, merchants and store owners may increasingly interact with users in virtual reality environments. Currently, users may have to exit the virtual reality environment to make a payment. Exiting the virtual reality environment may make a user's payment credential entry more secure, since a user may be more aware or cautious about observers detecting their payment credentials. However, exiting the virtual reality environment may disrupt the user's virtual reality experience and compromise the immersive feeling desired for a virtual reality experience.

Accordingly, there is a need for systems and methods that allow users to complete payment transactions while immersed in a virtual reality environment. There is also a need for systems and methods which allow users to enter payment credentials (e.g., personal identification number ("PIN numbers"), Card Verification Value (CVVs), etc.) in a manner in which their payment credentials are not easily detectable to an observer. The present disclosure is directed to overcoming one or more of these above-referenced challenges.

SUMMARY OF THE DISCLOSURE

According to certain aspects of the disclosure, systems and methods are disclosed for generating a virtual reality payment authentication entry interface comprising an interactive icon.

In accordance with another embodiment, a system is disclosed for generating a virtual reality payment authentication entry interface, the system comprising: a data storage device storing instructions for generating a virtual reality payment authentication entry interface in an electronic storage medium; and a processor configured to execute the instructions to perform a method including: receiving, over a computer network, a request for payment authorization; identifying, based on the request for payment authorization, a virtual reality interface; generating an icon in the virtual reality interface, the icon having a randomized display of authentication characters; receiving user input associated with at least one character of the of payment authentication characters in the virtual reality interface; and generating a payment authorization response to the request for payment authorization based on the received user input.

In one embodiment, a computer-implemented method is disclosed for generating a virtual reality payment authentication entry interface, the method comprising: receiving, over a computer network, a request for payment authorization; identifying, based on the request for payment authorization, a virtual reality interface; generating an icon in the virtual reality interface, the icon having a randomized display of authentication characters; receiving user input associated with at least one character of the of payment authentication characters in the virtual reality interface; and generating a payment authorization In accordance with another embodiment, a non-transitory machine-readable medium storing instructions that, when executed by the server, causes the server to perform a method for generating a virtual reality payment authentication entry interface, the method including: receiving, over a computer network, a request for payment authorization; identifying, based on the request for payment authorization, a virtual reality interface; generating an icon in the virtual reality interface, the icon having a randomized display of authentication characters; receiving user input associated with at least one character of the of payment authentication characters in the virtual reality interface; and generating a payment authorization Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. As will be apparent from the embodiments below, an advantage to the disclosed systems and methods is that a user may provide payment authentication credentials in a virtual reality environment, without having the credentials being detectable to an individual or observer in the same physical space as the user. The disclosed systems and methods discussed below may allow a user to securely enter their payment credentials in a VR environment. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIGS. 3A-3D depict flowcharts of methods for receiving payment credentials using interactive virtual reality icons, according to one or more embodiments.

FIG. 9 depicts a virtual reality icon and payment credential entry interface that minimizes interruptions of a user's virtual reality environment, according to one or more embodiments.

DETAILED DESCRIPTION OF EMBODIMENTS

Figure 1:
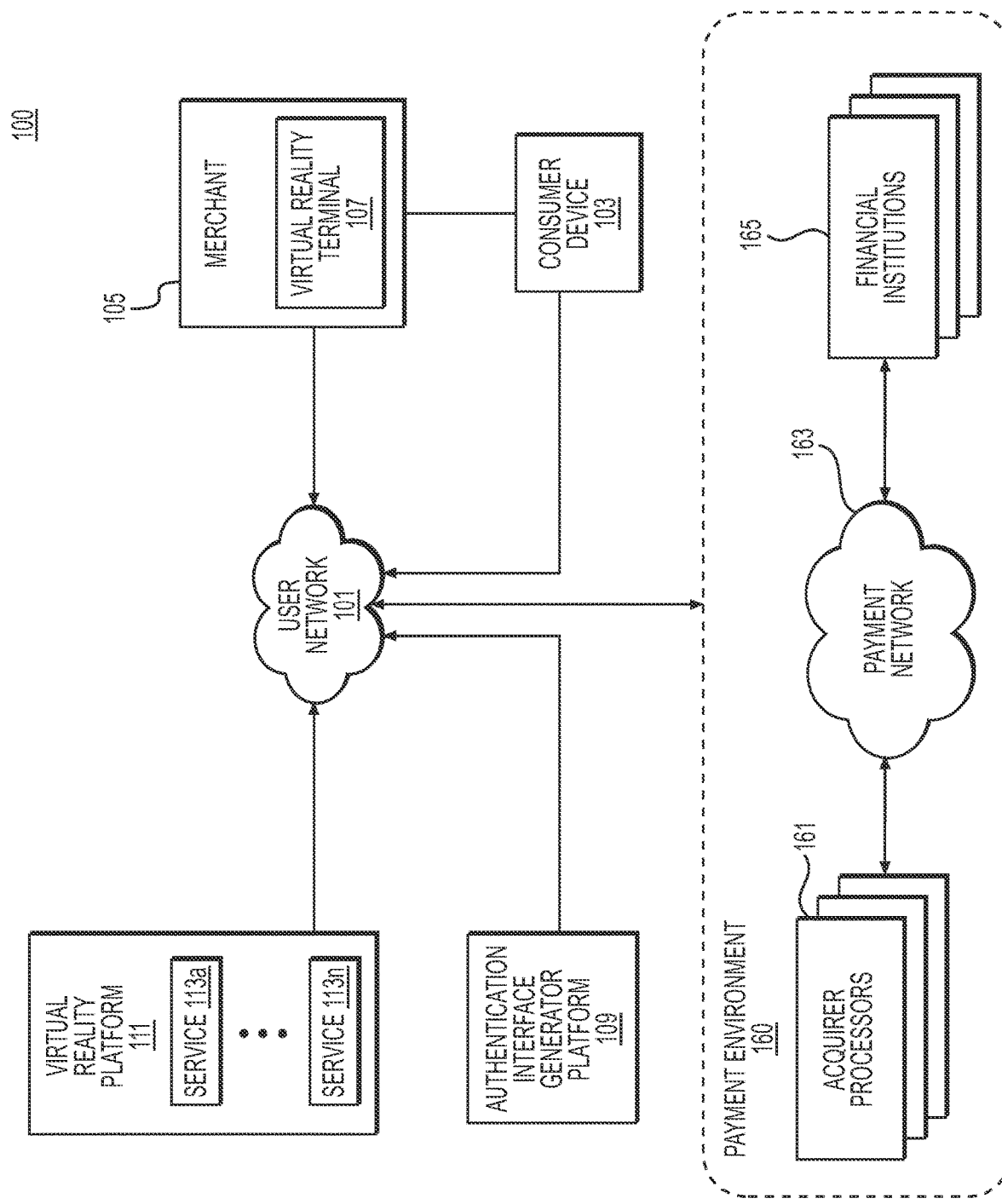
FIG. 1 depicts a block diagram of an environment and user network for authenticating payment transactions in virtual reality environments, according to one or more embodiments.

Various embodiments of the present disclosure relate generally to a virtual reality or augmented reality electronic payment infrastructure and to generating a virtual reality or augmented reality payment authentication entry interface.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

For simplicity, the description that follows will be provided by reference to a "payment vehicle" or a "payment card," which generally refers to any type of financial alternative to cash. As is to be clear to those skilled in the art, no aspect of the present disclosure is specifically limited to a specific type of payment vehicle or payment card. Therefore, it is intended that the following description encompasses the use of the present disclosure with many other forms of financial alternatives to cash, including credit cards, debit cards, smart cards, chip-based payment cards, single-use cards, prepaid cards, electronic currency (such as might be provided through a cellular telephone or personal digital assistant), and the like. Payment vehicles or payment cards can be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, prepaid or stored-value cards, electronic benefit transfer cards, a "virtual" card (e.g., in the form of a display on a smart phone), or any other like financial transaction instrument. In any event, the payment vehicles described herein communicate account information (e.g., an account number or other account indicative information) during a purchase event and/or payment or credit transaction.

While some of the embodiments below refer to payment credential entry as being user's entry of their PIN number entry, no aspect of the present disclosure is specifically limited to the payment credential being a PIN number. It is intended that the following description encompasses the use of the present disclosure with any form of payment credential, including Card Verification Value (CVV), a payment vehicle number (e.g., a credit card number), a password, or any other type of payment credential verifying the user's identity through a plurality of (alphanumeric) characters.

Traditionally, merchants and other store owners may accept user payment credentials (e.g., PIN numbers) via point of sale (POS) devices. Requesting that a user enter payment credentials via a POS device during a virtual session may mean that a user must disengage from a virtual reality setting and interact with a physical POS device. For example, a user may remove their virtual reality headset or otherwise stall their virtual reality experience to enter payment credentials at a POS device. Such interactions interrupt the user's virtual reality experience. In addition, traditional POS devices often present a standardized format, e.g., an arrangement of 12 buttons positioned in 4 rows and 3 columns, each button labeled with a number, letter, and/or symbol. This standard arrangement of alphanumeric characters provides easy detectability of a user's payment credentials from an observer. Such detectability is especially problematic in a virtual reality environment, where the user may be less aware of their physical surroundings and the observers near them.

Figure 4:
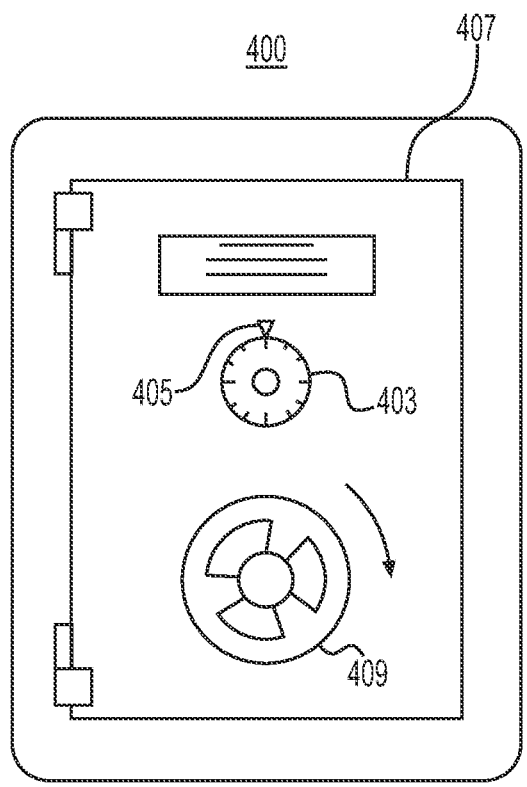
FIGS. 4, 5, 6, and 7A-7C depict virtual reality icons and use cases of the icons, according to one or more embodiments.

The disclosed systems and methods provide an improvement to the current problem of disruptive payment requests, by presenting an interface by which users may enter payment credentials while immersed in a virtual session. One such embodiment may include presenting an icon within the virtual session and prompting a user to interact with the icon. For example, the user may be prompted to enter payment credentials through interactions with the icon. In some present embodiments, the icon may include a representation of any object that may serve as a visual signal to a user to enable or "unlock" certain actions, e.g., payment authorization. The icon may depict any physical object that a user may associate with secure information or storage. While several embodiments may describe the icon as being a safe (e.g., as shown in FIG. 4), the icon may be a graphic depicting any lock, combination lock, lock system, safety deposit box, safe box, lock box, gate, door, security system, POS device, etc.

Figure 5:
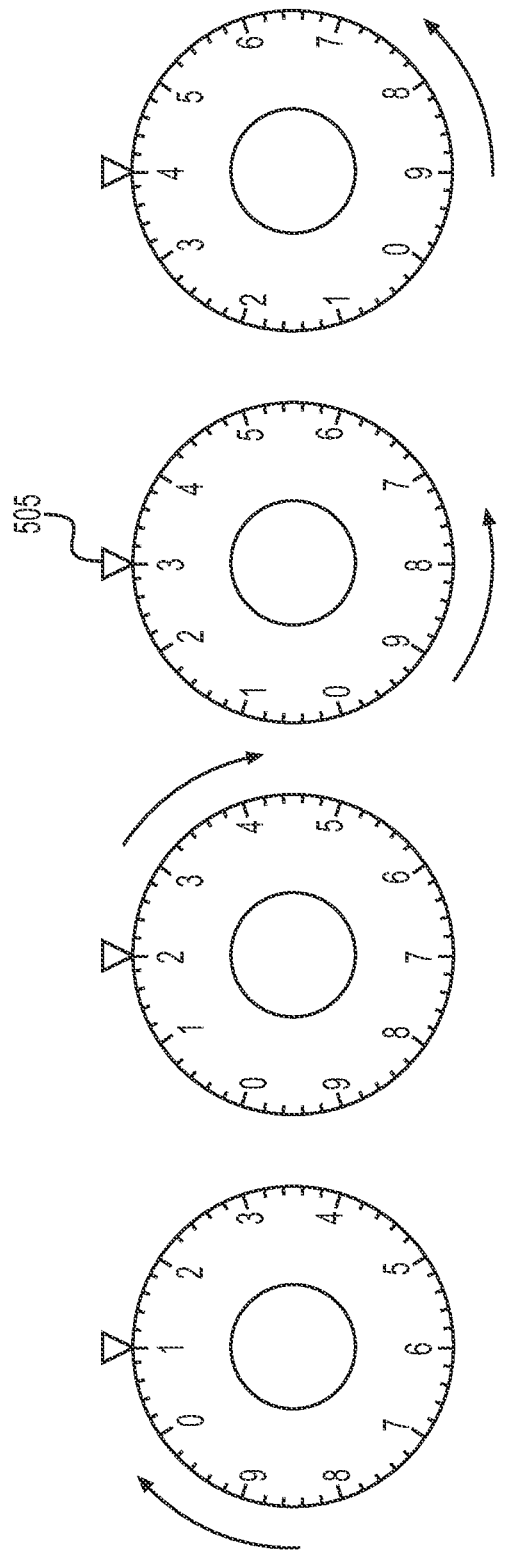

In some embodiments, the icon may include a dial (e.g., dial 403) and a selection marker (e.g., marking 405), which may be used for a user to select their payment credentials. For example, the dial may include a display of multiple characters (e.g., alphanumeric characters, symbols, etc.), e.g., as shown by FIGS. 5 and 7A-7C. The user may then be prompted to enter their payment credentials by selecting the randomly placed characters, e.g., via gesture(s) or a VR-compatible handheld device. Characters may be selected by receiving input from a user comprising, e.g., pointing a cursor, pressing a button, contacting a haptic surface, touching a touchscreen, etc. Alternately or in addition, payment credentials may be entered by "turning" a dial on the icon (e.g., as shown by FIG. 5). A character selection may be made by aligning a particular character on the dial, with a marker (e.g., marking 505). In particular, FIG. 5 illustrates an embodiment of entering the series of characters, "1", "2", "3", "4." In some cases, the icon may be designed such that, in addition to aligning a particular character on the dial with the marker, a user must take a further action to signify that a character selection is complete. For example, a user may click an "enter" button or say out loud, "next," after aligning their character of choice with the marker, in order to complete a character selection.

Figure 6:
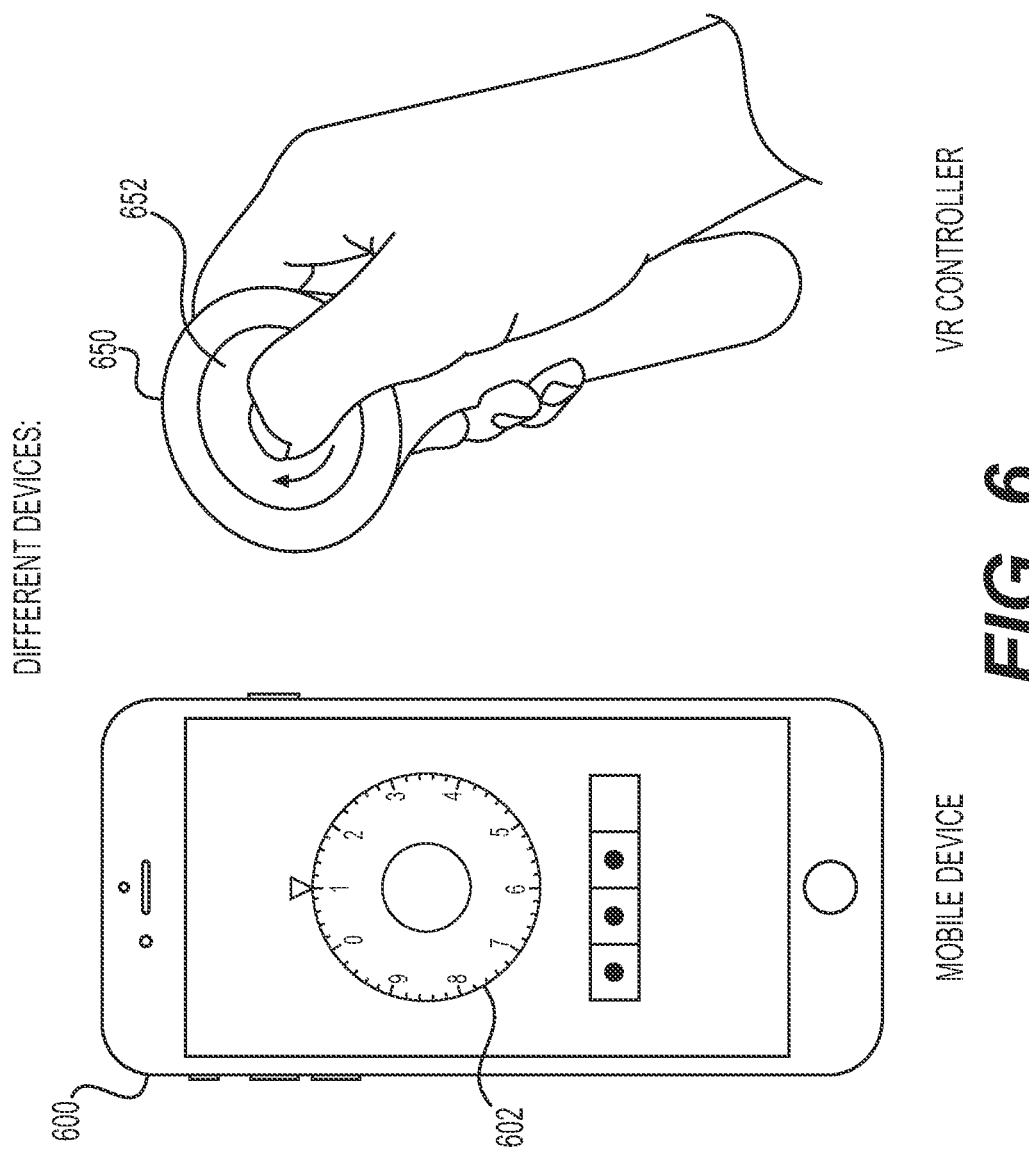

The dial turning motion may be provided by an interface or VR-compatible device, e.g., a mobile device 600 or a VR controller 650 as shown by FIG. 6. The turning motion may be captured via a touchscreen interface 602, a touchpad 652, user gesture (comprising a finger, wrist, or arm motion, etc.), or any other way of capturing a rotating motion.

Figure 7C:
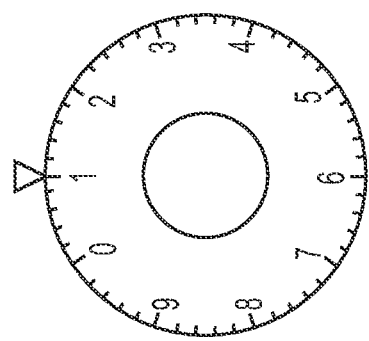
Figure 7B:
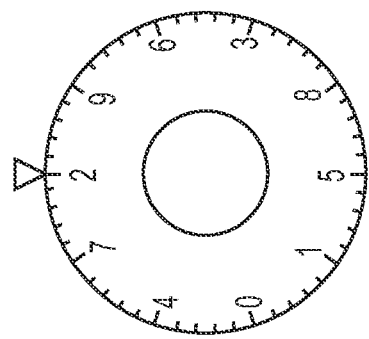
Figure 7A:
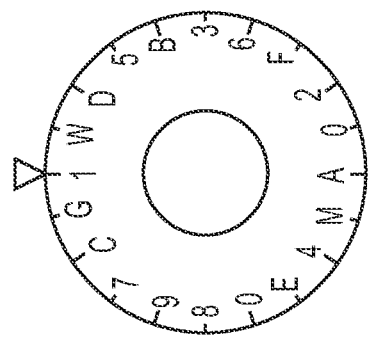

To ensure that the user's interactions with the icon may not reveal the user's payment credential(s) to an observer, the icon may include a randomized display of multiple characters (e.g., alphanumeric characters, symbols, etc.), e.g., as shown by FIGS. 7A-7C. For example, the placement of the characters on the dial of the icon may be randomized. Since the characters are part of the virtual reality experience, observers outside of the virtual reality interface then cannot see which characters are being offered to the user for selection, or which characters are being selected.

For example, FIG. 7B includes a set of randomized characters that has less complexity than the randomized characters illustrated by FIG. 7C. The display of FIG. 7C may be considered more complex than that of FIG. 7B, since the display of FIG. 7C has a higher number of characters and a greater range of character type (e.g., number and letters) than the display of FIG. 7B. In some cases, the rotation direction may be part of the payment credential, to add an extra layer of security. One such scenario may include storing each character of a PIN number payment credential with a rotation direction, such that a user must input both a correct character and the character's stored rotation direction, for the user's entry to be considered a correct character selection.

Further, the complexity of the placement may increase, depending on the transaction amount associated with a payment authentication request. For example, a user, merchant, or payment vehicle may be associated with one or more predetermined transaction amounts. In one scenario, payment authentication request transaction amounts that exceed the predetermined transaction amounts may prompt the display of the randomized icon of the present embodiments, each with an elevated level of difficulty in the placement of the characters. Payment authentication request transaction amounts that are lower than the predetermined transaction amounts may bypass the prompt for more payment credentials, or involve a presentation of an icon with consecutive characters (e.g., as shown by FIG. 7A).

For an embodiment where complexity varies in the character type or randomization, a payment authentication request transaction amount exceeding only a predetermined first threshold amount (e.g., $50) may prompt a request to the user to enter their payment credentials in the form of the dial of FIG. 7A, in which characters follow a known (numerical) sequence. A payment authentication request transaction amount exceeding a predetermined second threshold amount (e.g., $100) may prompt a request to the user to enter their payment credentials in a more difficult setting by providing the dial of FIG. 7B, in which the character placement is randomized. A payment authentication request transaction amount exceeding a predetermined third threshold amount (e.g., $150) may prompt a request to the user to enter their payment credentials in an even more difficult interface (e.g., the dial of FIG. 7C) in which the characters are placed in a randomized order, and the characters available for selection include various types of characters, e.g., numbers and letters. Increasing predetermined threshold transaction amounts may be paired with increasingly complex interfaces.

Alternately or in addition, difficulty level may be increased by the frequency of the change to the character graphics. In one such embodiment, the placement of the character graphics may stay the same until a user selects their PIN for a transaction amount exceeding only the first threshold amount of $50; a transaction amount exceeding the threshold amount of $100 may prompt a randomization of half of the positions of the character graphics in the icon; and a transaction amount exceeding the threshold amount of $150 may involve a randomization of the positions of the character graphics in the icon every single time a user selects one character. In other words, each character may be displayed in a different position each time a user selects a character, for the interface associated with a transaction amount exceeding the highest threshold. In this case, the interface may be updated each time the user selects a character.

Another layer of difficulty may incorporate movement of the characters, e.g., the characters may be animated or moving objects for a user to "capture" via gesture or a handheld device. Higher transaction fees may correspond to animated (or increasingly animated) characters in the virtual environment.

Yet another layer of security may lie in the credentials themselves. For example, a user or payment vehicle may be associated with multiple payment credentials, each payment credential having a different level of complexity. Different payment credentials may be requested, depending on a transaction amount.

Complexity for a payment credential may increase as the payment credential incorporates a greater number of characters, and as the character types vary. For example, a payment credential comprised of 4 number characters is less complex than a payment credential comprised of 1 number character, 2 letter characters, and 1 symbol. A payment credential comprising 12 or 20 characters is also more complex than a credential comprising 4 characters. In some embodiments, transaction amounts exceeding only the first threshold amount may trigger the request of a simple (e.g., 4-character) payment credential, while transaction amounts exceeding the third threshold amount may trigger the request of a complex (e.g., 12 character) payment credential.

In one embodiment, prompts for security credentials may be simplified if a user has previously established credibility. For example, if a user has already been authenticated within a single virtual reality session, they may only be prompted to enter a portion of their payment credentials, rather than a full payment credential. For instance, if a user's PIN is 8 characters and the user is detected to have previously approved transactions, prompts for payment credentials may include requests such as, "please enter the $3^{rd}$ character of your PIN" or "please enter the $3^{rd}$, $5^{th}$, and $8^{th}$ character of your PIN." One such exemplary interface is shown at FIG. 9. These prompts for partial credential entries may cause less disruption than asking a user to enter their full credentials each time a transaction is requested, within a single virtual reality session. While the present embodiments describe virtual reality scenarios, the same embodiments and icons may be generated for augmented reality settings.

Figure 2:
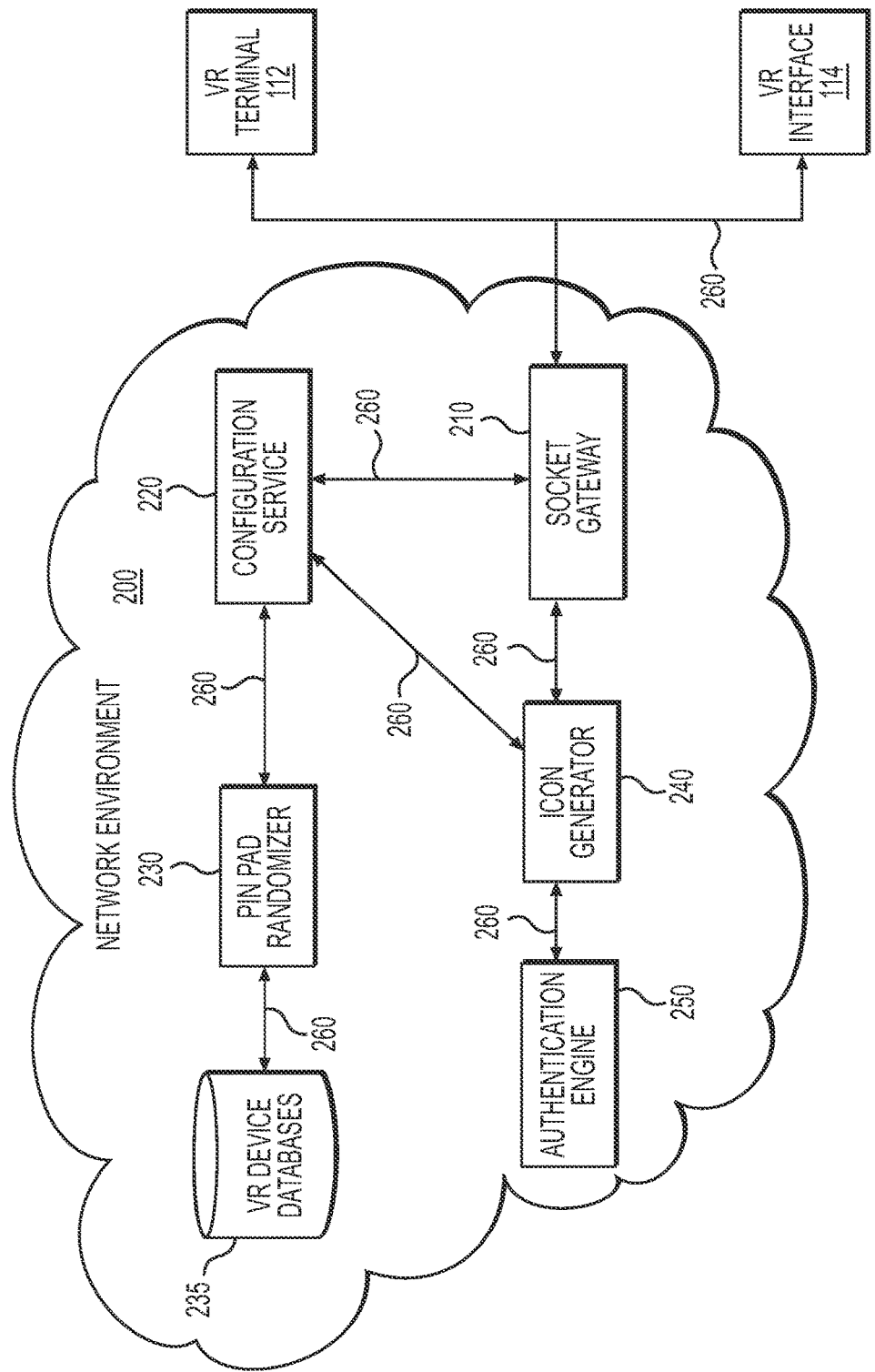
FIG. 2 depicts an exemplary system infrastructure for generating randomized, interactive virtual reality payment authentication icons, using a computer network, according to one or more embodiments.

Referring now to FIG. 1, a block diagram is depicted of an exemplary environment 100 and user network 101 for authenticating payment transactions in virtual reality environments, according to an exemplary embodiment of the present disclosure. User network 101 may include one or more functionalities for processing payment transactions via data gathered from virtual reality environments. Exemplary functionalities of user network 101 are depicted in FIG. 2. Environment 100 may include at least one consumer device 103. The consumer device 103 may include one or more virtual reality (VR) consumer products, e.g., a VR headset, VR or augmented reality (AR) eyewear, a VR immersive system, a smartphone, mobile phone, tablet computer, laptop, portable computer, watch, wearable device, or a combination thereof. Payment authentication may be collected via user interfaces displayed to a user using the consumer device 103. The payment authentication interface may be initiated by a merchant 105, authentication interface generator platform 109, virtual reality platform 111, or a combination thereof.

The merchant 105 may operate at least one virtual reality terminal 107. The virtual reality terminal 107 may be in contact with the consumer device 103. In one embodiment, the virtual reality terminal 107 may provide one or more payment authentication interface(s) to the consumer device 103 and/or receive user input (for payment authentication) from the consumer device 103. For example, the virtual reality terminal 107 may receive a user's input comprising a PIN number or other secure code comprising a payment authorization credential, from the consumer device 103.

The payment authentication interface(s) may be generated by the authentication interface generator platform 109 and/or the virtual reality platform 111. Virtual reality platform 111 may host one or more services 113a-113n (or services 113). The virtual reality platform 111 and services 113 may provide immersive VR experiences. In one embodiment, a consumer device 103 may be linked to a virtual reality platform service 113a via the virtual reality platform 111. The link may be initiated by Bluetooth, a Quick Response (QR) code, NFC tag, etc. and then maintained via secure tunnel (e. g., secure socket layer ("SSL"), virtual private network ("VPN"), etc.). In one embodiment, authentication interface generator platform 109 may prompt various display(s) inside the VR experiences of services 113a-n. For example, authentication interface generator platform 109 may prompt a service 113a to display a payment verification icon or graphic. The payment verification display may include a prompt to the user to submit a payment credentials (e.g., a secure code for payment to be verified). The secure code may include a personal identification number ("PIN number"). The authentication interface generator platform 109 may further generate displays including the above-described interactive icon for entry of payment credentials, a graphic indicating successful completion of payment, or a graphic showing denial of payment or unsuccessful payment authorization.

Once a consumer submits payment information via consumer device 103, virtual reality terminal 107 may send a payment request to a payment environment 160. The payment request may be sent by way of a payment network 163 to an acquirer processor 161. Alternatively, such a request may be sent by a component that controls a flow of a transaction, such as an authentication engine 250, as depicted in FIG. 2. Acquirer processor(s) 161 may request, by way of payment network 163, an electronic transfer of funds from the received funds to the financial institution(s) 165 associated with merchant 105. Merchant 105 may provide an infrastructure for processing electronic payment requests.

FIG. 2 depicts an exemplary system infrastructure for generating virtual reality payment authentication entry interfaces comprising an interactive icon, according to one or more embodiments. As shown in FIG. 2, an infrastructure comprising network environment 200 may processing electronic payment requests. Network environment 200 may be part of user network 101 and/or the authentication interface generator platform 109. Exemplary network environment 200 may include a virtual reality terminal 112 and a virtual reality authentication interface 114. Virtual reality terminal 112 may refer to virtual reality terminal 107 of the merchant 105 in FIG. 1, or any transaction-related VR socket in communication with consumer device 103. Virtual reality interface 114 may be comprised of an interactive display shown at the consumer device 103. Authentication response (e.g., PIN number entry) may be received via interface 114. Virtual reality terminal 112 and virtual reality authentication interface 114 may be in communication with an network environment 200 via socket gateway 210. Socket gateway 210 may send commands to VR terminal 112 to generate entry interface 114.

Network environment 200 may further include a configuration service 220, a ("PIN pad" or payment credential character) randomizer 230, and a VR device database 235. Configuration service 220 may, if necessary, configure the interface 114 upon connection of the VR terminal 112 to the infrastructure. Configuration service 220 may comprise an individual software vendor specializing in storing or verifying payment credentials. For example, configuration service 220 may work with randomizer 230 to generate randomized interfaces 114 for a consumer to use in entering their payment credentials. VR device database 235 may maintain configuration data associating each VR terminal 112 and interface 114. In this way, VR device database 235 and configuration service 220 may ensure that the display provided by randomizer 230 is compatible with the VR terminal 112 and user device 103 (not shown), and able to display VR interface 114. VR device database 235 may also comprise an augmented reality device database.

In one embodiment, network environment 200 may further include icon generator 240 and authentication engine 250. Icon generator 240 may provide a virtual representation of the interface 114 and may maintain a current state of the interface 114. In other words, configuration service 220 may prompt icon generator 240 to generate an icon to show at interface 114, and randomizer 230 may interact with icon generator 240 to generate a randomized components of the icons. For example, randomized components may include a randomized display of characters on a dial of a virtual safe icon, presented for a user to select characters from the randomized display. Authentication engine 250 may compare payment credentials received through interface 114, with stored payment credentials of the configuration service 220. If the received payment credentials match the stored credentials, authentication engine 250 may approve a payment request. If a match does not occur, authentication engine 250 may reject a transaction payment request and/or prompt generation of another interface 114 for the user to try again.

According to one or more embodiments, the components of network environment 200 may be connected by a computer network 260, such as, for example a local area network (LAN) or a wireless network, such as, for example, a WiFi network. However, other network connections among the components of network environment 200 may be used, such as, for example, a wide area network (WAN), the internet, or the cloud. According to one or more embodiments, the components of network environment 200 may operate to generate various interface(s) 114 that a user may use in a VR environment to enter payment authentication credentials.

Methods of generating randomized virtual reality payment authentication entry interfaces according to one or more embodiments will be discussed with respect to FIGS. 3A-FIG. 9 below. Functions of the components of network environment 200 will be described below with respect to exemplary methods for generating randomized virtual reality payment authentication entry interfaces.

Any suitable system infrastructure may be put into place for generating randomized virtual reality payment authentication entry interfaces. FIGS. 1 and 2 and the discussion above provide a brief, general description of a suitable computing environment in which the present disclosure may be implemented. In one embodiment, any of the disclosed systems, methods, and/or graphical user interfaces may be executed by or implemented by a computing system consistent with or similar to that depicted in FIGS. 1 and 2. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Figure 3C:
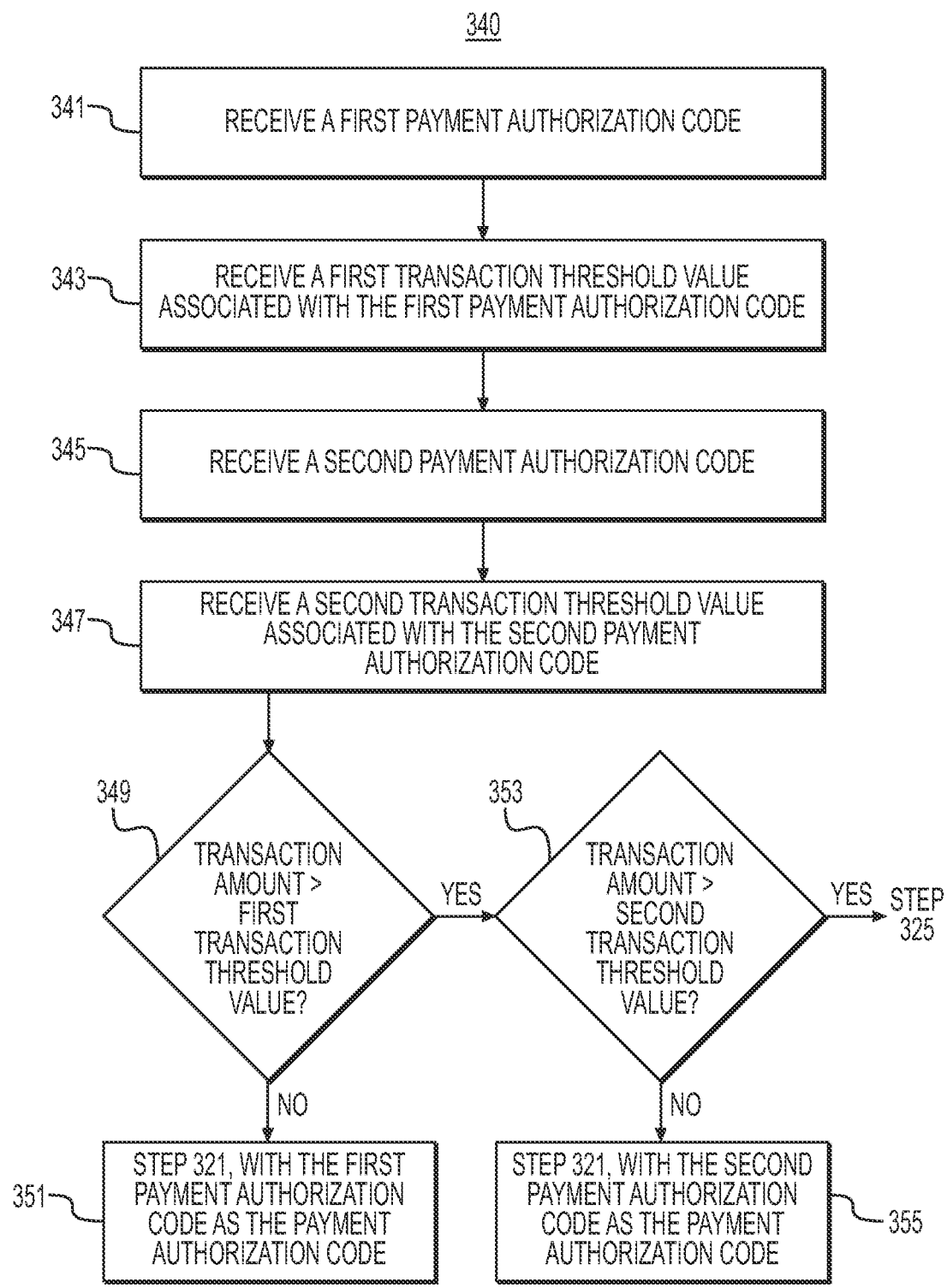

FIGS. 3A-3D provide methods for receiving payment credentials in order to authorize payment. In particular, FIG. 3A depicts an exemplary method 300 for generating an interactive icon based on a predetermined threshold amount, in order to receive payment credentials. FIG. 3B depicts an exemplary method 320 of prompting generating an interactive icon multiple time, based on a user's character selection (s). FIG. 3B is an illustration of the method of FIG. 3A, if a user's selection is somehow erroneous, for instance. Method 320 of FIG. 3B may be repeated multiple times, for a user to have more than one attempt at entering their payment credentials. In some embodiments, the method 320 may only be repeated a set number of times, before a user's account is locked or a warning is sent, e.g., to authentication engine 250. The warning may indicate that multiple attempts of payment credential entry have occurred in the VR environment, and security may be enhanced for the user account. For example, more complex icons may be generated, users may be prompted to enter more complex or secondary payment authorization codes, notification(s) may be sent to a user requesting the user to confirm that they had tried to enter payment credentials, etc. Such security or warning measures may be performed or prompted the authentication engine 250 or any exemplary component displayed in FIGS. 1 and 2.

Figure 3D:
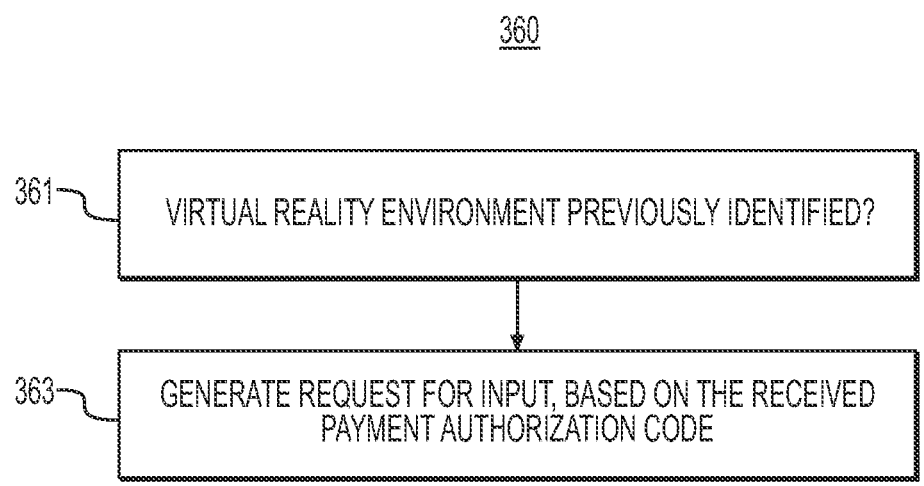

FIGS. 3C and 3D illustrate methods that may enhance security while facilitating a user's virtual reality experience. For example, FIG. 3C illustrates an exemplary method of requesting payment authorization codes, based on transaction amounts. For example, more expensive purchases may warrant more complex payment authorization codes. The method of FIG. 3C depicts how to determine which payment authorization codes to use for a given transaction. FIG. 3D depicts an exemplary method of generating icons or payment credential requests, based on whether a user has already previously entered their payment credentials or been authorized for payment, while in the same virtual reality session. For example, a user may want to purchase multiple objects or items while in a single virtual reality session. Continually requesting that a user enter their entire payment credentials may disrupt the user experience. FIG. 3D is an embodiment or reducing the interruptions to a user, if the user was previously authorized to complete a payment transaction. The methods depicted in FIGS. 3A-3D are described in detail below.

FIG. 3A depicts a flowchart of a method 300 for verifying payment credentials and authorizing a payment transaction, according to one embodiment of the present disclosure. In particular, the verification method of method 300 includes generating a virtual reality payment authentication entry interface, according to one embodiment of the present disclosure. In step 301, the merchant 105 (e.g., a merchant processor) and/or the consumer device 103 may receive (over network 101) a request for a payment authorization. The payment authorization request may originate from a virtual reality environment via virtual icons/objects, as shown in the embodiment depicted by FIGS. 4A-9. In one embodiment, the payment authorization request may be associated with a particular payment vehicle. The payment authorization request may also be associated with a user identifier (e.g., user ID), user authentication information, user device identifier, or a combination thereof.

In one embodiment, the request for payment authorization may include a transaction amount. In some cases, method 300 may be performed only if the transaction amount exceeds a pre-determined threshold amount, e.g., where a transaction amount exceeds £30. (Transaction amounts under the threshold amount may be considered too minor to interrupt the user to request payment credentials.) In one embodiment, the merchant 105 and/or the consumer device 103 may receive or store the pre-determined threshold amount, or multiple pre-determined threshold amounts. Accordingly, step 303 may include determining whether the received transaction amount exceeds a pre-determined threshold amount. If the transaction amount exceeds the threshold amount, method 300 may proceed to generating the virtual reality payment authentication interface. If not, payment authorization may be initiated (e.g., step 313).

As context, payment authorization may be provided if a user is able to verify their identify in association with the selected payment vehicle. Verification may take place by via entry of a correct PIN number, submission of biometric data, or any other information that certifies that the user is authorized to make payments with the selected payment vehicle. Exemplary FIGS. 4-9 illustrate a scenario where the requested form of verification comprises PIN entry, and the payment vehicles may comprise credit cards.

If the received transaction amount exceeds a predetermined threshold amount, step 305 may include identifying a virtual reality environment, e.g., a virtual reality interface as shown in FIGS. 4A-9. The identification may take place, for example, via a linkage or electronic "handshake" between the virtual reality terminal 107 and a user's consumer device 103. For example, step 305 may include detecting a virtual reality device displaying a virtual reality environment. The detection may include receiving the user identifier, user authentication information, or user device identifier associated with the payment authorization request (of step 301) and detecting a virtual reality device associated with the received user identifier, user authentication information, or user device. In another instance of step 305, identifying the virtual reality environment may include detecting a virtual reality device or platform connected to the same network as a consumer device (e.g., in FIG. 1, where virtual reality platform 111 and consumer device 103 are both connected to user network 101).

Step 307 may include generating an interactive icon comprising a picture, graphic, emoji, animation, symbol, or any visual illustration. The icon may be an image of a recognizable lock, e.g., a safe, a combination lock, padlock, bolt system, gears, lock box, etc. The lock may include a dial, for instance, a rotating component (or set of rotating components) labeled with payment authentication characters comprising one or more numbers, symbols, letters, or other markers. An exemplary embodiment is shown at FIG. 4, which depicts an icon 400 comprising a representation of a security safe or combination padlock comprising a dial 403 or rotating interface. In some embodiments, the payment authorization characters may include alphanumeric characters. The interactive icon of step 307 may seek or prompt user entry of payment authentication information, e.g., information comprising a personal identification number (PIN).

The order of the authentication characters on the dial may be randomized. For instance, the characters may be arranged around the dial 403 or rotating interface of the safe/padlock icon, and the placement of each of the characters around the dial 403 or the rotating interface is randomized. The interactive icon may include a marking or structure to select one or more of the authentication characters. For example, the interactive icon may include a marking (e.g., a notch, line, arrow, etc., as depicted in FIG. 4 as marking 405). An authentication character may be selected by aligning the authentication character to the marking. For an example of a structure, the icon of step 307 may include a slot, window, or opening, and a selection of an authentication character may be made by aligning an authentication character so that it is framed by the slot, window, or opening. Step 309 may include receiving a selection of an authentication character.

In one embodiment, the interactive icon may be created at step 307, and remain the same until a set of authentication characters is selected. The selected authentication characters may then undergo verification, as described in more detail at FIG. 3B. Step 309 may include receiving a selection of one of the plurality of payment authentication characters. The selection may include a user input, e.g., a gesture, drag and drop motion, a grabbing motion, a wave, a click, a point, etc. Step 311 may include generating an updated interactive overlay upon receipt of the user's input or selection. In one scenario, the placement of each of the characters of the plurality of payment authentication characters is randomized in the virtual reality interface.

In some embodiments, the interactive icon may be updated while selections of authentication characters are made (e.g., step 311). For example, step 311 may include updating the icon upon receipt of user input. For example, the order of the authentication characters on the dial may be randomized and scrambled when an authentication character is selected. For some cases, the randomization may take place each time an authentication character is selected. In other cases, the randomization of step 311 may be performed for every few selections made (e.g., randomizing after the third character selection or after the fifth character selection). Character selections may be made by user inputs received via gestures, pointers, "clicks" on a handheld device, voice command, etc.

The frequency of randomization or performance of step 311 may depend on one or more factors, including preset/default settings, the received transaction amount, an authorization code, errors in selections of authentication characters, user history, etc. For an example in which frequency of randomization depends on a received transaction amount, randomization may occur more in situations where transactions amounts are higher versus in scenarios where transaction amounts are lower. For example, method 300 may include receiving or retrieving multiple pre-determined threshold amounts or tiers. In one embodiment, a transaction amount exceeding a predetermined threshold amount/tier by value "x" may entail character randomization after each authentication character selection and a transaction amount exceeding a predetermined threshold amount/tier by value "y" may entail character randomization after every other authentication character selection. The value of "x" may be greater than the value "y," in such a case, so that greater security is provided where received transaction amounts are higher in value. In general, method 300 may include receiving a transaction amount associated with a request for payment authorization, and randomizing a placement of each authentication character on the icon, based on the received transaction amount.

As an example where randomization is dependent on an authorization code, a short authorization code may entail randomization after each authentication character selection, whereas a long authorization code may involve randomization after a grouping (e.g., 3-4 characters) has been entered. Randomization depending on errors in character selection may involve increasing the frequency of character randomization, depending on how often a user selects characters that do not match a stored authorization code. User history-dependent randomization may involve detecting whether the payment transaction of method 300 is analogous to past purchases made by the user. For example, method 300 may include referencing a user's purchase history when receiving the request for payment authorization of step 301. In cases where the request of step 301 is consistent with the user's past purchases (e.g., in type of product purchased or in the purchase amount), randomization may be minimized. If, however, the purchase deviates from a user's past purchases, randomization may occur after each character selection. The purchase history may refer to a user's stored purchases, across various virtual reality and/or augmented reality sessions, or within a single session.

Based on the user's selection/inputs at the interactive display, a payment authorization response to the request for payment authorization may be generated. For example, if a user selects their PIN from the randomized display of characters, a payment authorization approval message may be transferred to complete a transaction. If the user does not successfully enter their PIN in the randomized display of characters, a payment authorization denial message may be generated to deny the transaction. In some cases, the randomized display may only permit the user a set number of options before refreshing. For example, if a PIN number comprises four characters, the display may randomize the display four times, once for each time a user enters a character selection. Method 300 may be implemented once, where a user has one chance to enter their PIN number correctly. Alternately, randomized displays may be presented multiple times, to provide a user with more than one opportunity to enter their PIN. FIG. 3B illustrates such an embodiment, where randomized virtual reality icons for payment credential entry may be provided multiple times.

FIG. 3B illustrates a method 320, in which updated interfaces are generated multiple times. For fraud purposes, the likelihood is low that method 320 would be implemented until a payment authorization code is selected, since this may allow a user to keep "guessing" payment credentials. However, method 320 may be useful to provide a user with multiple attempts in entering their payment credentials. The number of times updated interfaces are provided may correspond to payment amount. For example, a higher transaction amount may correspond to fewer opportunities for a user to enter their payment credentials, than in a scenario with a lower transaction amount.

In one embodiment of method 320, step 321 may include first receiving a payment authorization code (e.g., a PIN). The payment authorization code may be received by the virtual reality terminal 107, the consumer device 103, and/or an entity at the payment network 163. This received payment authorization code may be associated with the user and their payment vehicle, and it may be used to verify the user's input. As with step 305 of method 300, step 323 may include identifying a virtual reality environment (e.g., an environment including icon 400 of FIG. 4).

Step 325 may include generating a randomized display including an overlay of a plurality of payment authentication characters in the virtual reality environment. Step 327 may include receiving a selection of at least one of the displayed authentication characters. Step 329 may include generating an updated randomized display of the payment authentication characters based on the user's selection. If the user's input or selection matches the received payment authorization code (of step 321), a payment authorization approval response may be generated (e.g., steps 331 and 333). If the user's input does not match the received payment authorization code, the payment denial response (or denial of payment authorization response) may be generated, or another randomized display may be generated and presented in the VR environment (e.g., steps 331 and 325). In some cases, erroneous character selections may prompt an animation or display change in the icon. For example, a virtual safe icon may shake, change color, or have an "explosion" animation if erroneous payment credentials are received from a user. The animations or depictions may include a message, for example, "Wrong PIN. Start Over."

In some embodiments, step 325 may further include generating a "start over" button or visual cue for a user to either reset, refresh, or clear their character selections. Step 325 may also include generating a visual cue of how many characters have been entered by a user. For example, step 325 of generating the icon may include generating the icon to include a progress bar that may advance as characters are selected, or displaying a symbol (e.g., a hash) for each character selection made by a user. Step 327 of receiving a selection of authentication characters may also include receiving other cues or signals from a user. For example, a user may "shake" or "swipe" the icon to reset their character selections. Step 327 may include receiving these gestures from a user, e.g., via a VR controller, smartphone device, VR glove interface, etc., and resetting the icon to clear previous character selections.

In one embodiment, step 321 of receiving a payment authorization code may involve varying complexity. FIG. 3C illustrates a method 340, in which multiple payment authorization codes may be associated with a user, to ensure security in payment authorization. For example, the various payment authorization codes may vary in complexity, and more complex authorization codes may be applied for transactions involving high transaction amounts while simple authorization codes may be used for transactions involving low transaction amounts. Method 340 is one embodiment for applying different payment authorization codes, depending on the transaction amount.

In one embodiment of method 340, step 341 may include receiving a first payment authorization code, and step 343 may include receiving a first transaction threshold value associated with the first payment authorization code. Step 345 may include receiving a second payment authorization code, and step 347 may include receiving a second transaction threshold value associated with the second payment authorization code. In some cases, the second transaction threshold value may be higher than the first transaction threshold value. In such situations, the second payment authorization code may also be more complex than the first payment authorization code. Increased complexity may entail the number of characters in a code and/or the variation of characters in a given code. For example, a payment authorization code comprising a string of 15 characters may be more complex than a payment authorization code comprising 4 or 6 characters. Also, a payment authorization code having numbers, capital letters, lower case letters, and symbols may be more complex than an authorization code having only numbers.

Step 349 may include determining whether a received transaction amount (e.g., from step 301) exceeds the first transaction threshold value. If the received transaction amount does not exceed the first transaction threshold value, the first payment authorization code may be used as the user's payment credential/payment authorization code (e.g., in method 300 or in method 320). If the received transaction amount does exceed the first transaction threshold value, the transaction amount may be compared to the second transaction threshold value (e.g., step 353). The second payment authorization code may be used as the user's payment credential/payment authorization code if the transaction amount does not exceed the second transaction threshold value (e.g., step 355).

If the transaction amount does exceed the second transaction threshold value, method 340 may include determining another payment authorization code and/or another transaction threshold value. Another embodiment of method 340 may include using both the first payment authorization code and the second transaction authorization code, if the transaction amount exceeds the second transaction threshold value. In such an embodiment, a user may be prompted to undergo a two-step authorization, in which both the first and the second payment authorization codes must be selected before a payment may be authorized or approved. Alternately or in addition, method 340 may include defaulting to randomizing the display of payment authentication characters on the icon for each character selection and/or otherwise increasing the complexity of the icon interface.

In one embodiment, step 323 of identifying a virtual reality environment may involve varying complexity of a payment interface, depending on whether a user has already submitted their payment credentials in the virtual reality environment. A user may grow impatient at having to continually submit payment credentials. Method 360 of FIG. 3D provides a method in which payment credential requests may be tempered, based on a user's prior activity within a virtual reality environment. For example, step 361 may include detecting if an identified virtual reality session was previously identified. Step 363 may then include generating a request for input, based on a payment authorization code (e.g., of step 321). The request for input may include a request for a particular character of the code (e.g., "please enter the $3^{rd}$ character of your PIN" or "please enter the $5^{th}$ character and the $8^{th}$ character of your PIN," etc.). The request for input may include an icon, or a "fill in the blank" format, e.g., as shown in FIG. 9. In one instance, method 360 may include generating a request for a portion of a payment authorization code (e.g., a PIN), the portion being less than the entire PIN. Method 360 may then include generating a payment authorization response based on the received portion of the PIN.

FIG. 4 illustrates an exemplary icon, according to an exemplary embodiment. As previously discussed, the icon 400 may include a dial 403 (or other rotating feature/interface). Icon 400 may further include a marking 405, for a user to indicate a character selection on dial 403. A series of characters may be entered by aligning a character to a marker, e.g., marking 405 of FIG. 4 or marking 505 of FIG. 5. To illustrate, the characters entered in FIG. 5 is, "1", "2", "3", "4." Character entries may be made via screen interfaces on mobile devices 600 or controllers, e.g., controller 650 and/or dial touchpad 652 of FIG. 6. The characters may be displayed in varying degrees of complexity and randomization, e.g., as shown by FIGS. 7A, 7B, and 7C. FIG. 7A has the least complex, non-randomized interface of the three interfaces and FIG. 7C illustrates the most complex and randomized interface out of the three interfaces.

In some embodiments, icon 400 may include a door 407, which may open if correct payment credentials are entered. The icon 400 may also include a handle 409 (e.g., a circular handle) for the door. The handle 409 may animate and rotate prior to the door 407 opening. In some cases, the icon 400 may include a prompt for a user to turn or otherwise interact with handle 409 to open the door 407.

Once the door 407 opens, a user interface may be presented, in which the user's different payment methods may be displayed for selection. For example, multiple payment methods or vehicles associated with the user/entered payment credentials may be stored. Additional detail on payment method virtual reality interfaces is included in the description for FIGS. 8A-8C.

If the wrong payment credentials are entered, a user may be presented with a visual cue to try again. In some embodiments, a user may be given a limited amount of chances to enter their payment credentials. The icon 400 may be updated to indicate when a payment credential is wrong, and how many changes a user has left. For example, if platform 109 permits three attempts and a user's first entry of payment credentials is wrong, icon 400 may be generated to display a message, e.g., "Wrong PIN. You have 2 more attempts before your account is locked." In some cases, icon 400 may also be colored to indicate an error. For example, icon 400 may change from being grey in color to red in color, if erroneous credentials are entered. Other possible visual cues may include animations, e.g., shaking or moving of icon 400. Alternately or in addition, errors may also include haptic prompts. For example, a user's controller or device may vibrate or shake in response to a wrong credential entry, e.g., as a visual animation of a shaking icon 400 is displayed.

Icon 400 may also incorporate displays or methods of interaction to allow a user to clear an entry. For example, icon 400 may include a "start over" or "delete" button. Icon 400 may also permit interaction, e.g., a user "picking up" the virtual icon 400 (via a controller) and shaking it, in order to reset or clear an entry. Icon 400 may further incorporate a visual cue of how many characters have been entered. For example, character boxes 907 and hashed character 911 of FIG. 9 indicate how many characters a user has entered, and how many characters have yet to be entered. In the depiction of FIG. 9, the character boxes 907 indicate how many characters a user may select to enter their payment credentials, and hashed character 911 may indicate the number of characters a user has already selected. Other such visual cues may include progress bars, countdowns, color fluctuations, etc.

Figure 8A:
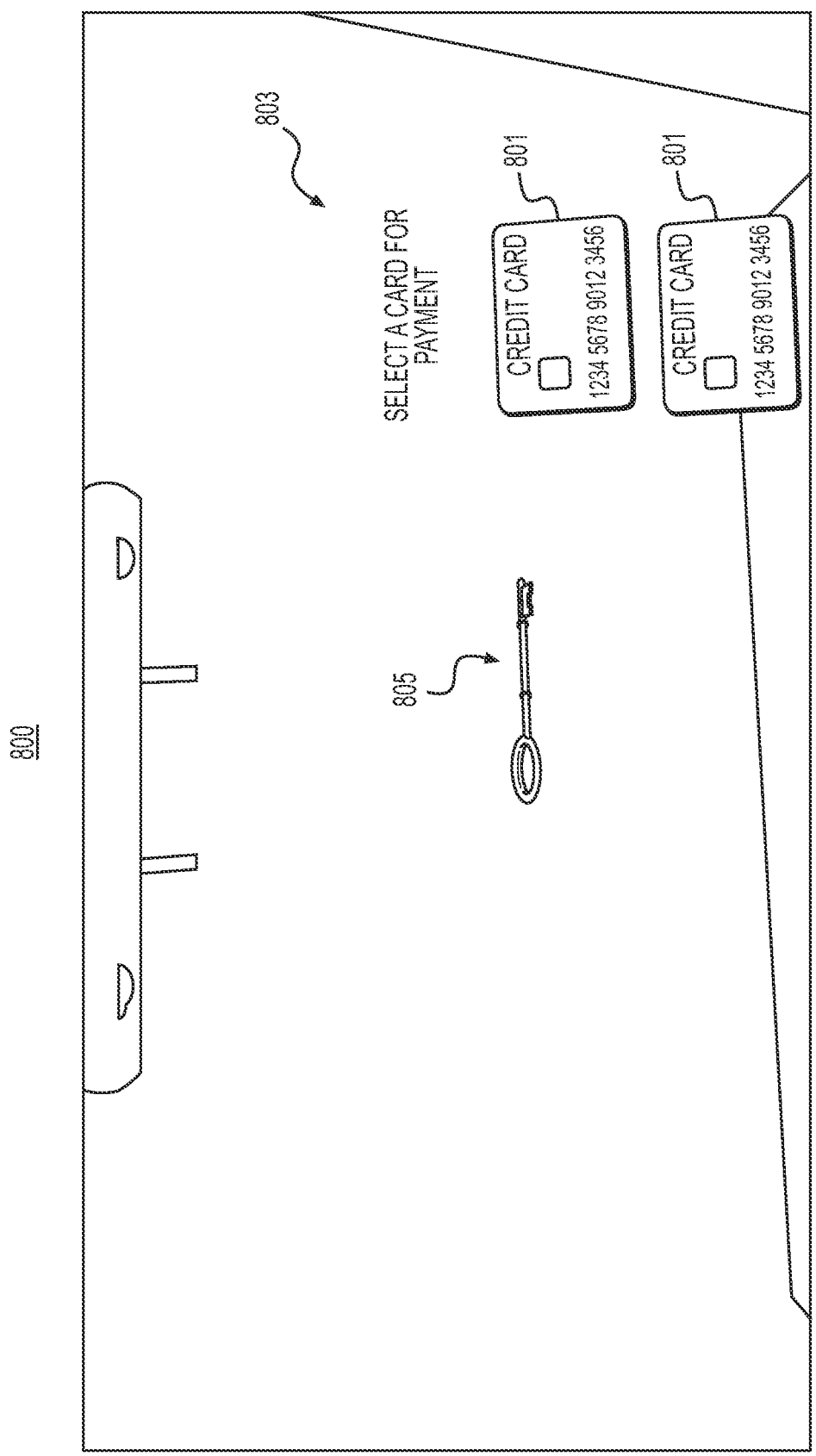
FIGS. 8A-8C depict virtual reality payment interfaces, according to one or more embodiments.

FIG. 8A illustrates an exemplary virtual reality interface 800 displaying various stored payment methods, including payment vehicles 801 (e.g., credit cards, debit cards, smart cards, chip-based payment cards, single-use cards, prepaid cards, virtual cards, electronic currency (such as might be provided through a cellular telephone or personal digital assistant), and the like). The payment methods may also include payment accounts, e.g., bank accounts. In such cases, the virtual reality interface 800 may include, for instance, logos of banks associated with the bank accounts.

Figure 8B:
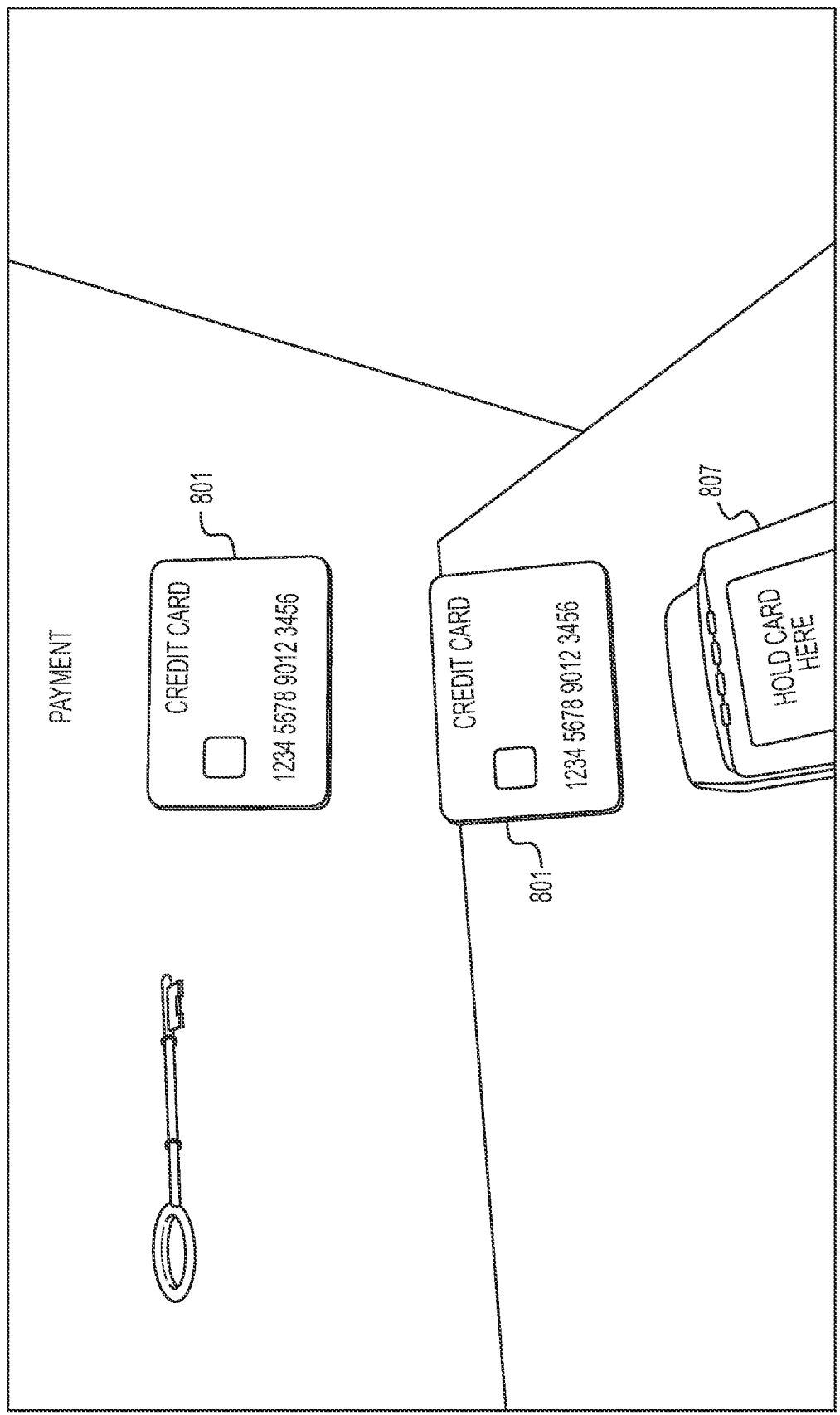
Figure 8C:
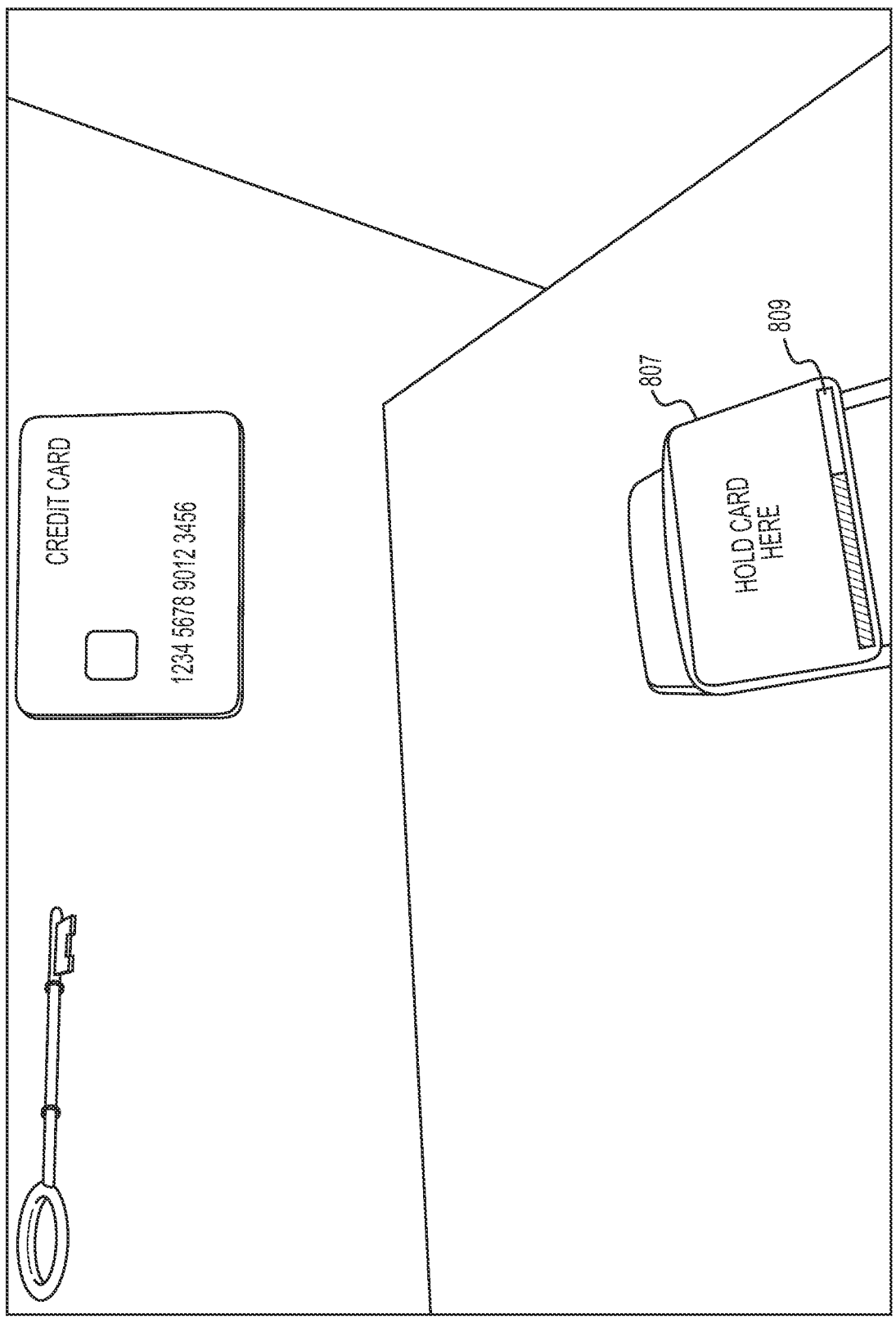

In some cases, the virtual reality interface 800 may include a prompt, e.g., prompt 803 providing instructions to a user. In the illustrated interface 800, prompt 803 instructs a user to "select a card for payment." Interface 800 may further include an icon 805 denoting a user's position or reflecting a user's motions. Icon 805 may serve as a cursor, and a user may control the position of icon 805 using a handheld device, or through gestures, e.g., a hand or leg motion. As shown in FIG. 8B, interface 800 may further include a request portal icon 807. In one embodiment, a user may initiate a payment request by positioning a payment vehicle display 801 over the request portal icon 807. The request portal icon 807 may be configured to look like a point of sale (POS) device, or any other graphic to allow a user to definitively select a payment vehicle for payment. FIG. 8C shows an exemplary request portal icon 807 including a progress bar 809, indicating receipt of the selection of a payment vehicle. The payment vehicle selection may be associated with the payment authorization request.

Figure 10:
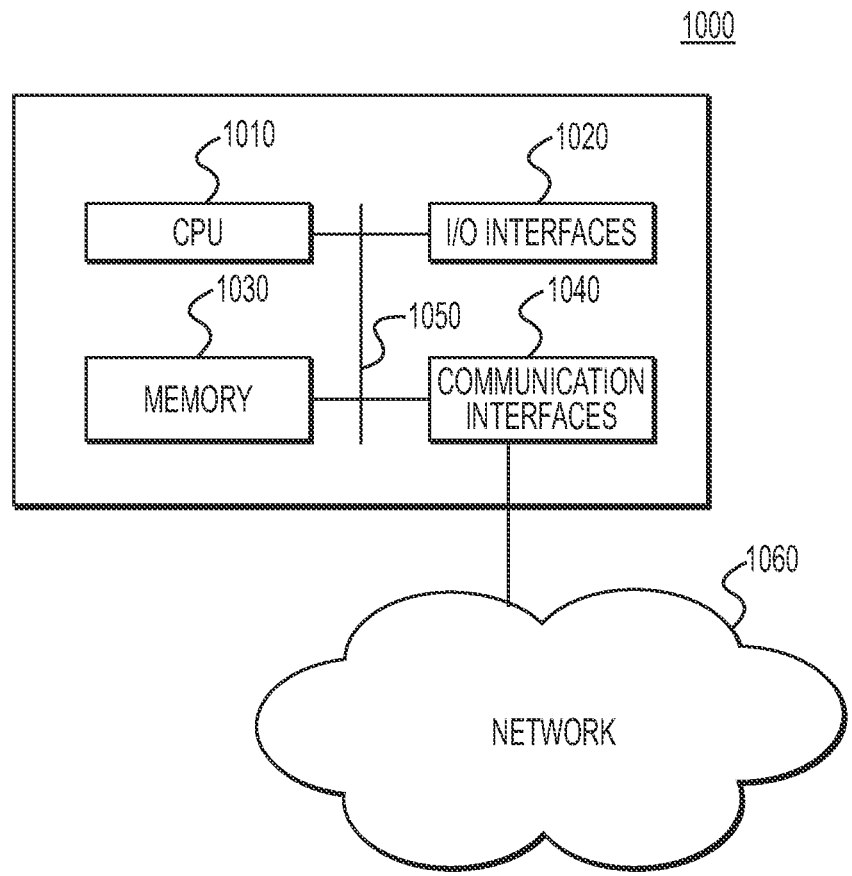
FIG. 10 depicts a block diagram of an example computing environment, according to one or more embodiments.

The systems and processes described above may be performed on or between one or more computing devices, e.g. configuration service. FIG. 10 illustrates an example computing device. A computing device 1000 may be a server, a computing device that is integrated with other systems or subsystems, a mobile computing device such as a smart phone, a cloud-based computing ability, and so forth. The computing device 1000 may be any suitable computing device as would be understood in the art, including without limitation, a custom chip, and embedded processing device, a tablet computing device, a POS terminal associated with the merchant 105, a back-office system of a merchant 105, a personal data assistant (PDA), a desktop, laptop, microcomputer, and minicomputer, a server, a mainframe, or any other suitable programmable device. In various embodiments disclosed herein, a single component may be replaced by multiple components and multiple components may be replaced by single component to perform a given function or functions. Except where such substitution would not be operative, such substitution is within the intended scope of the embodiments.

The computing device 1000 may include a processor 1010 that may be any suitable type of processing unit, for example a general-purpose central processing unit (CPU), a reduced instruction set computer (RISC), a processor that has a pipeline or multiple processing capability including having multiple cores, a complex instruction set computer (CISC), a digital signal processor (DSP), application specific integrated circuits (ASIC), a programmable logic devices (PLD), and a field programmable gate array (FPGA), among others. The computing resources may also include distributed computing devices, cloud computing resources, and virtual computing resources in general.

The computing device 1000 may also include one or more memories 1030, for example read-only memory (ROM), random access memory (RAM), cache memory associated with the processor 1010, or other memory such as dynamic RAM (DRAM), static RAM (SRAM), programmable ROM (PROM), electrically erasable PROM (EEPROM), flash memory, a removable memory card or disc, a solid-state drive, and so forth. The computing device 1000 also includes storage media such as a storage device that may be configured to have multiple modules, such as magnetic disk drives, floppy drives, tape drives, hard drives, optical drives and media, magneto-optical drives and media, compact disk drives, Compact Disc Read Only Memory (CD-ROM), compact disc recordable (CD-R), Compact Disk Rewritable (CD-RW), a suitable type of Digital Versatile Disc (DVD) or BluRay disc, and so forth. Storage media such as flash drives, solid-state hard drives, redundant array of individual discs (RAID), virtual drives, networked drives and other memory means including storage media on the processor 1010, or memories 1030 are also contemplated as storage devices. It may be appreciated that such memory may be internal or external with respect to operation of the disclosed embodiments. It may be appreciated that certain portions of the processes described herein may be performed using instructions stored on a computer readable medium or media that direct computer system to perform the process steps. Non-transitory computable-readable media, as used herein, comprises all computer-readable media except for transitory, propagating signals.

Networking communication interfaces 1040 may be configured to transmit to, or receive data from, other computing devices 1000 across a network 1060. The network and communication interfaces 1040 may be, for example, an Ethernet interface, a radio interface, a Universal Serial Bus (USB) interface, or any other suitable communications interface and may include receivers, transmitter, and transceivers. For purposes of clarity, a transceiver may be referred to as a receiver or a transmitter when referring to only the input or only the output functionality of the transceiver. Example communication interfaces 1040 may include wire data transmission links such as Ethernet and TCP/IP. The communication interfaces 1040 may include wireless protocols for interfacing with private or public networks 1060. For example, the network and communication interfaces 1040 and protocols may include interfaces for communicating with private wireless networks such as Wi-Fi network, one of the IEEE 802.11x family of networks, or another suitable wireless network. The network and communication interfaces 1040 may include interfaces and protocols for communicating with public wireless networks 1060, using for example wireless protocols used by cellular network providers, including Code Division Multiple Access (CDMA) and Global System for Mobile Communications (GSM). A computing device 1000 may use network and communication interfaces 1040 to communicate with hardware modules such as a database or data store, or one or more servers or other networked computing resources. Data may be encrypted or protected from unauthorized access.

In various configurations, the computing device 1000 may include a system bus 1050 for interconnecting the various components of the computing device 1000, or the computing device 1000 may be integrated into one or more chips such as programmable logic device or application specific integrated circuit (ASIC). The system bus 1050 may include a memory controller, a local bus, or a peripheral bus for supporting input and output devices 1020, and communication interfaces 1060. Example input and output devices 1020 include keyboards, keypads, gesture or graphical input devices, motion input devices, touchscreen interfaces, one or more displays, audio units, voice recognition units, vibratory devices, computer mice, and any other suitable user interface.

The processor 1010 and memory 1030 may include nonvolatile memory for storing computable-readable instructions, data, data structures, program modules, code, microcode, and other software components for storing the computer-readable instructions in non-transitory computable-readable mediums in connection with the other hardware components for carrying out the methodologies described herein. Software components may include source code, compiled code, interpreted code, executable code, static code, dynamic code, encrypted code, or any other suitable type of code or computer instructions implemented using any suitable high-level, low-level, object-oriented, visual, compiled, or interpreted programming language.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for generating a virtual reality payment authentication entry interface in a virtual reality environment, the system comprising:
  a data storage device storing instructions for generating the virtual reality payment authentication entry interface in an electronic storage medium; and
  a processor configured to execute the instructions to perform a method including:

receiving, over a computer network, a request for payment authorization, the payment authorization including a transaction amount;

determining the transaction amount exceeds a pre-determined threshold amount;

generating a virtual interactive icon in a virtual reality payment authentication entry interface, based on determining the transaction amount exceeded the pre-determined threshold amount;

receiving user input associated with one or more payment authentication characters in the virtual reality payment authentication entry interface;

generating, based on the user input, an updated interactive overlay of the one or more payment authentication characters, wherein the processor is configured to randomly rearrange a non-sequential order of placement of the payment authentication characters in the updated interactive overlay at an increased frequency of randomization based on the transaction amount exceeding the pre-determined threshold; and generating a payment authorization response to the request for payment authorization based on the received user input.

2. The system of claim 1, wherein the payment authorization request is associated with a payment vehicle.

3. The system of claim 1, wherein the virtual interactive icon comprises a representation of a security safe or combination padlock comprising a dial or rotating interface.

4. The system of claim 3, wherein the one or more payment authentication characters are displayed on the dial or rotating interface in a non-sequential order.

5. The system of claim 3, wherein the virtual interactive icon includes a marking for selection of the one or more payment authentication characters.

6. The system of claim 5, wherein the virtual interactive icon is updated while the one or more payment authorization characters are selected.

7. The system of claim 1, further comprising:
identifying, based on determining the transaction amount exceeded the pre-determined threshold amount, the virtual reality payment authentication entry interface, wherein the identification of the virtual reality payment authentication interface comprises a linkage between a virtual reality terminal and a consumer device.

8. The system of claim 1, wherein the processor is further configured for:
updating the virtual interactive icon upon receipt of user input.

9. A computer-implemented method for generating a virtual reality payment authentication entry interface in a virtual reality environment, the computer-implemented method comprising:

receiving, over a computer network, a request for payment authorization, the payment authorization including a transaction amount;

determining the transaction amount exceeds a pre-determined threshold amount;

generating a virtual interactive icon in a virtual reality payment authentication entry interface, based on determining the transaction amount exceeded the pre-determined threshold amount;

receiving user input associated with one or more payment authentication characters in the virtual reality payment authentication entry interface;

generating, based on the user input, an updated interactive overlay of the one or more payment authentication characters, wherein a non-sequential order of placement of the payment authentication characters in the updated interactive overlay is randomly rearranged at an increased frequency of randomization based on the transaction amount exceeding the pre-determined threshold; and generating a payment authorization response to the request for payment authorization based on the received user input.

10. The method of claim 9, wherein the payment authorization request is associated with a payment vehicle.

11. The method of claim 9, wherein the virtual interactive icon comprises a representation of a security safe or combination padlock comprising a dial or rotating interface.

12. The method of claim 11, wherein the one or more payment authentication characters are displayed on the dial or rotating interface in a non-sequential order.

13. The method of claim 12, wherein the virtual interactive icon includes a marking for selection of the one or more payment authentication characters.

14. The method of claim 9, further comprising:
identifying, based on determining the transaction amount exceeded the pre-determined threshold amount, the virtual reality payment authentication entry interface, wherein the identification of the virtual reality payment authentication interface comprises a linkage between a virtual reality terminal and a consumer device.

15. The method of claim 9, further comprising:
updating the virtual interactive icon upon receipt of user input.

16. The method of claim 9, wherein the virtual interactive icon is updated while the one or more payment authorization characters are selected.

17. A non-transitory machine-readable storage medium storing instructions that, when executed by a server, cause the server to perform a method for generating a virtual reality payment authentication entry interface in a virtual reality environment, the method including:

receiving, over a computer network, a request for payment authorization, the payment authorization including a transaction amount;

determining the transaction amount exceeds a pre-determined threshold amount;

generating a virtual interactive icon in a virtual reality payment authentication entry interface, based on determining the transaction amount exceeded the pre-determined threshold amount;

receiving user input associated with one or more payment authentication characters in the virtual reality payment authentication entry interface;

generating, based on the user input, an updated interactive overlay of the one or more payment authentication characters, wherein a non-sequential order of placement of the payment authentication characters in the updated interactive overlay is randomly rearranged at an increased frequency of randomization based on the transaction amount exceeding the pre-determined threshold; and generating a payment authorization response to the request for payment authorization based on the received user input.

18. The non-transitory machine-readable storage medium of claim 17, wherein the payment authorization request is associated with a payment vehicle.

19. The non-transitory machine-readable storage medium of claim 17, wherein the virtual interactive icon comprises the representation of a security safe or combination padlock comprising a dial or rotating interface.

20. The non-transitory machine-readable storage medium of claim 19, wherein the one or more payment authentication characters are displayed on the dial or rotating interface in a non-sequential order.

\* \* \* \* \*